United States Patent [19]
Jones et al.

[11] 3,857,691
[45] Dec. 31, 1974

[54] GOB DISTRIBUTOR

[75] Inventors: Ronnie G. Jones; John P. Daly, both of Winchester, Ind.

[73] Assignee: Maul Bros. Inc., Millville, N.J.

[22] Filed: Oct. 9, 1973

[21] Appl. No.: 404,475

[52] U.S. Cl. ............... 65/303, 65/25 R, 65/304
[51] Int. Cl. ............................................ C03b 5/30
[58] Field of Search ............ 65/304, 303, 126, 127, 65/25, 262, 25 R

[56] References Cited
UNITED STATES PATENTS

| | | | |
|---|---|---|---|
| 3,340,038 | 9/1967 | Hartman | 65/304 |
| 3,536,468 | 10/1970 | Colchaguff | 65/262 X |
| 3,672,860 | 6/1972 | Keller | 65/304 X |
| 3,732,086 | 5/1973 | Heyne | 65/126 X |

*Primary Examiner*—Robert L. Lindsay, Jr.
*Assistant Examiner*—Frank W. Miga
*Attorney, Agent, or Firm*—Seidel, Gonda & Goldhammer

[57] ABSTRACT

A gob distributor cartridge for accelerating a glass gob in excess of the gravity effect, said cartridge has an inner peripheral surface that converges from the inlet end toward the outlet end. Around the convergeing surface there are a plurality of groups of angled air passages with positive air pressure behind to progressively increase the pushing and centering of the gob as the gob moves through the converging surface area.

9 Claims, 3 Drawing Figures

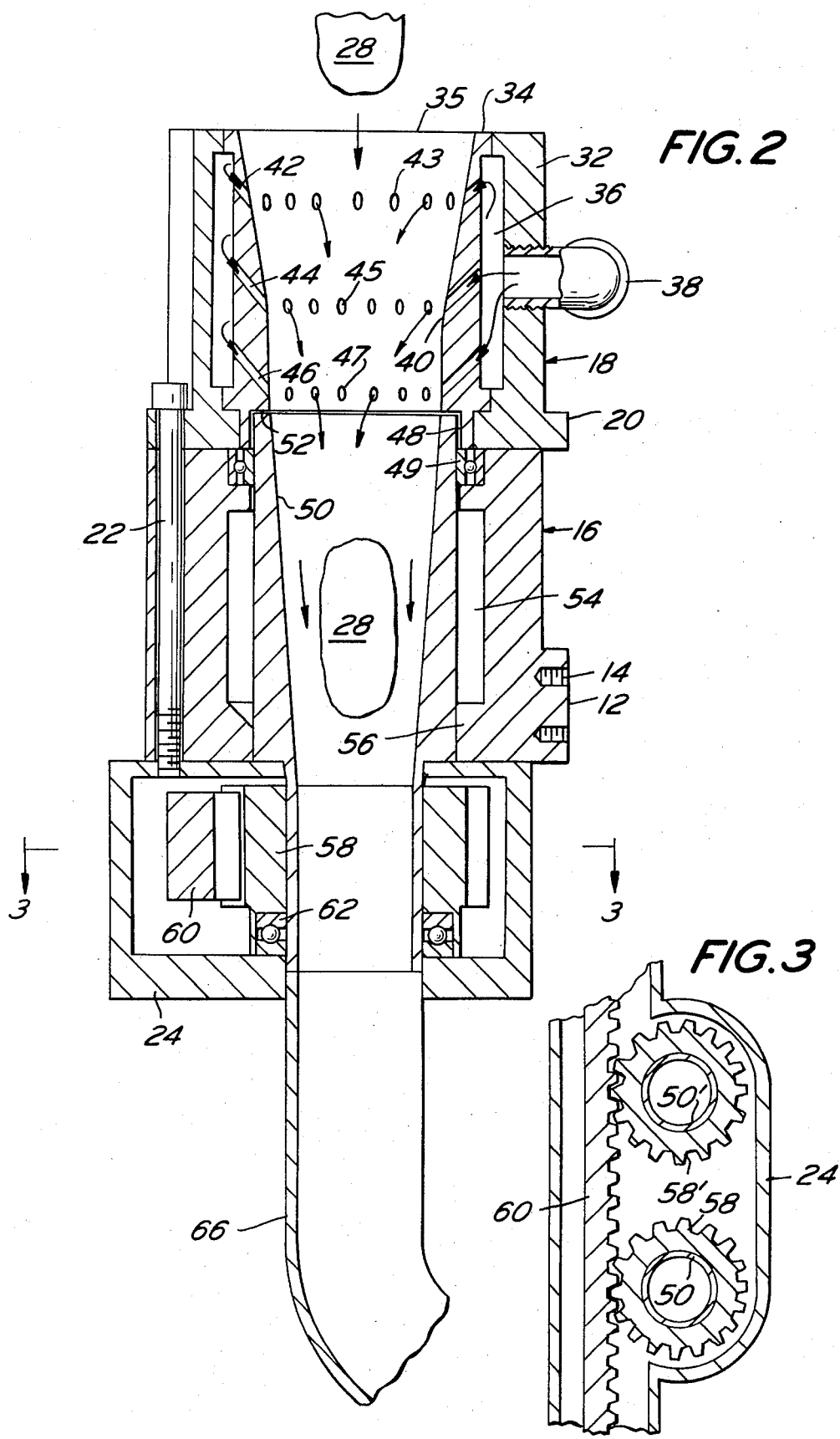

GOB DISTRIBUTOR

The present invention is directed to a gob distributor for use on a I.S. machine and in particular as directed to a gob distributor associated with the scoop on such a machine. The present invention came to light as a solution to a problem which originated when the number of sections on a I.S. machine was increased from eight to 10 sections. The transition from eight sections to 10 sections created timing problems in connection with gob distribution.

The scoops which distribute gobs to the various sections of the I.S. machine are rotated by a rack which in turn is controlled by a cam. In between each gob, the cam must rotate 36° to position the scoops at the next location and must remain there at a dwell for 14° on the cam to provide sufficient time for the gob to move through the scoop. The 14° dwell on the cam corresponds to 0.19 seconds. The present invention will permit the cam dwell to be reduced to about 10°.

On a 10 section I.S. machine, the difference between the center section and the end sections in the setting for the timing buttons on the timing drum is about 25°. This invention will substantially decrease or eliminate the difference by having all gobs transferred so as to arrive at the blank mold at each section at about the same time even though the gob for the center section only travels about 3 feet while the gobs for the end sections must travel about 8 feet. This would then provide for equal dead plate time with maximum cooling on all sections instead of only having such features on the center sections. At the present time, the end sections have about 25 percent less dead plate as compared with the center section. The overall result would be increased speed and/or more uniformity in the glassware produced.

The present invention includes a cartridge which may be sold separately for retrofits or as an integral part of the head assembly for a gob distributor. The cartridge is annular and has a manifold chamber. Gas which may be air, steam, or the like is discharged from the annular manifold chamber through openings to center a gob flowing through the cartridge. The openings converge downwardly in the direction of flow of the gob and act as a lubricating film between the gob and the delivery system. In addition, the gas is pressurized so that the gob is accelerated through the delivery system to the I.S. machine. The pressures of the gases on the various delivery systems vary with the distance from the center section of the I.S. machine. That is, the end sections will involve higher pressures so that the gobs may arrive at the end sections substantially the same time as the gobs arrive at the center sections.

In addition to the above mentioned advantages, increasing the delivery of the gob to the blank mold minimizes surface cooling of the gob. If enough velocity is imparted to the gob, it can enter the blank mold with sufficient force so as to form the neck finish without the need for settle blow air, thereby saving time and simplifying the equipment involved.

It is an object of the present invention to provide a novel gob distributor.

It is another object of the present invention to provide apparatus and method for distributing gobs to the sections of a I.S. machine in an accelerated manner with attendant advantages including more uniform dead plate time, transferring all gobs to their respective blank molds at substantially the same time, minimized cooling of the surface of the gob, etc.

It is another object of the present invention to provide a gob accelerator in the form of a cartridge which may be added to existing equipment in the field.

Other objects will appear hereinafter.

For the purpose of illustrating the invention, there is shown in the drawings a form which is presently preferred; it being understood, however, that this invention is not limited to the precise arrangements and instrumentalities shown.

FIG. 2 is a sectional view taken along the line 2—2 in FIG. 1.

FIG. 3 is a sectional view taken along line 3—3 in FIG. 2.

Figure 1:
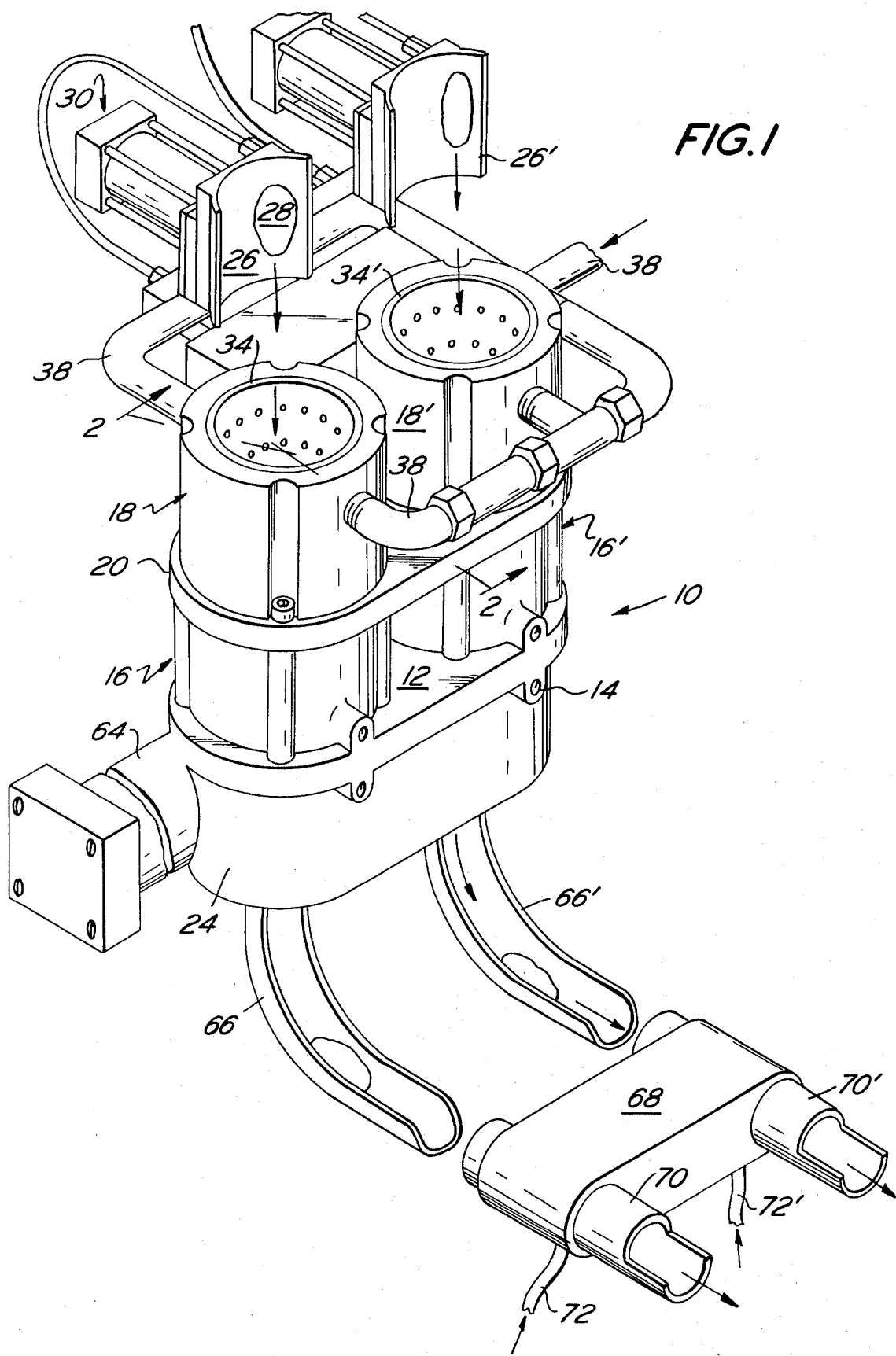
FIG. 1 is a perspective view of a gob distributor in accordance with the present invention.

Referring to the drawing in detail, wherein like numerals indicate like elements, there is shown in FIG. 1 a gob distributor in accordance with the present invention designated generally as 10. The gob distributor 10 is adapted to be supported in any suitable manner between the elevation of the shears and the elevation of a I.S. machine not shown.

The gob distributor 10 of the present invention is adapted for use with single gob, double gob or triple gob systems. For purposes of illustration, a double gob system is disclosed. Since the double gob system, except as will be made clear hereinafter, is identical with a single gob system, only a single gob system will be described in detail but corresponding primed numerals will be provided on the other system.

The gob distributor 10 includes a mounting plate 12 having holes 14 to facilitate installation on a suitable support. A first housing portion 16 extends upwardly from and is integral with the plate 12. The housing portion 16' is likewise integral with the plate 12. Housing section 16 is annular in cross-section and open at both ends.

A second housing portion or cartridge 18 is supported by the upper end of housing portion 16. The cartridge 18 includes a flange 20 which is coupled to the housing portion 16 and a third housing portion 24 by means of a plurality of bolts 22. See FIG. 2. When utilized for double gob operation, the cartridge 18' is likewise integral with the flange 20.

The cartridge 18 is supported immediately below the elevation of the deflector 26 supported by the cylinder unit 30 in a reciprocal manner. Thus, the deflector 26 may be selectively reciprocated by means of a piston cylinder arrangement to cause the deflector to intercept the downwardly falling gob 28 and deflect it so that it does not enter into the cartridge 18.

The cartridge 18 is open at each end and includes an outer cylindrical housing member 32 connected to an inner housing member or funnel 34. Members 32 and 34 may be secured together in any convenient manner such as by a shrink fit so as to establish the annular manifold chamber 36 therebetween.

A pressurized gas, such as air or steam at about 30 psi, is introduced into the manifold chamber 36 from opposite sides by conduits 38. The funnel 34 is provided with a plurality of rows of passages which converge in the direction of flow, that is away from the inlet end 35 of the funnel 34. The funnel 34 has a throat 40 and the inner surface of funnel 34 converges from the inlet end 35 to the throat 40. Passages 42 have exit holes 43 on the inner surface of funnel 34. The passage 44 likewise have exit holes 45. Passages 46 likewise may exit holes 47. The diameter at the inner surface of funnel 34 may be slightly greater at the outlet end than at the throat 40.

While FIG. 2 illustrates three rows of holes, namely the holes 43, 45 and 47, a greater or lesser number of rows may be provided. The rows may be staggered with respect to one another. The number of holes on the inner surface of funnel 34 and the cross-sectional area are chosen so that the holes are uniformly spaced from one another. The sum of the cross-sectional area of the holes 43, 45 and 47 is less than the area of the inlet to the manifold chamber 36 so that a positive pressure is maintained in said manifold chamber 36.

At the outlet end of the funnel 34, there is provided an axial extension 48 which is coaxial with the upper end of a rotatable bushing 50. A bearing 49 is provided for bushing 50 on housing portion 16. The bushing 50 converges in the direction of flow and its upper end has dimensions so as to generally form an extension of the ID of the funnel 34. The outer peripheral surface of the bushing 50 is spaced from the inner peripheral surface of the housing portion 16 so as to define a chamber 54. A shoulder 52 on the bushing 34 acts as an upper limit stop for the upper end of the bushing 50. The mounting plate 12 has an inwardly directed flange 56 which acts as a guide and bearing for the rotatable bushing 50.

The bushing 50 has a reduced diameter portion that extends downwardly through the third housing portion 24. Within the housing portion 24, the bushing 50 has a gear 58 secured to its outer peripheral surface. The gear 58 is in mesh with the teeth on rack 60, while being supported from below by bearing 62. The teeth on rack 60 are also in mesh with gears 58' on bushing 50'.

The rack 60 is provided within a housing 64 and is driven by the gob distributor cam in a conventional manner except as referred to herein. The lower end of the bushing 50 is aligned with one end of a curved scoop 66. This curved scoop 66 causes the gob 28 to be introduced into a head assembly 68. Head assembly 68 is constructed like the cartridge 18 with a similar arrangement opposite the scoop 66'. The discharge from the cartridges in head assembly 68 communicates directly with conduits 70. An air conduit 72 introduces air into the head assembly 68.

The conduits 70 may be in the form of troughs and are utilized to direct the gob to the blank mold of the sections of the I.S. machine. A head assembly with associated delivery conduits will be provided for each section of the I.S. machine and gobs will be distributed thereto by the gob distributor 10 in a sequential manner. The air pressure delivered by way of conduits 72 and 72' for the end sections of the I.S. machine will be greater than that utilized for the center section of the machine.

The conduit 70 may be made of plastic, metal, or the like. Preferably the conduit 70 are metal tubes coated on their inner peripheral surface with a thin layer of graphite or a self-lubricating plastic material such as Teflon.

In view of the above description, it is believed that those skilled in the art will readily understand the manner of operation of the present invention. Accordingly, only the following brief description is deemed necessary. The pressurized gas exiting from the holes 43, 45, 47 create a suction at the inlet end 35 of the funnel 34 and act as a lubricating film between the gob 28 and the inner peripheral surface of the entire system. If the shears are not properly adjusted, a gob 28 may be deflected slightly off center. The jets of air from the holes 43, 45 and 47 will center the gob with respect to the funnel 34 and bushing 50.

A positive pressure is maintained at all times in the manifold chamber 36. The air discharged into the funnel 34 behind a gob 28 accelerates the movement of the gob sufficiently so that the 14° dwell on the cam which operates the rack 60 may be reduced to about 10°.

A head assembly 68 with conduits and/or troughs 70, 70' are provided for each section of the I.S. machine. The air pressure introduced into the various head assemblies is progressively higher for the sections of the machine as a function of their distance from the center section so as to minimize the difference in arrival time of the gobs to the various blank molds. As pointed out above, this has the effect of substantially equalizing the dead plate time for cooling at the various sections for more uniform glassware and increased speed. Increasing the delivery of the gobs to the blank molds minimize the surface cooling of the gobs. In some cases, sufficient velocity will be imparted to the gobs so that they enter the blank mold with sufficient force so as to form neck finish without the need for settle blow air.

The cartridge 18 may be sold as a separate article of manufacture for retrofitting existing equipment in the field or may be part of the initial equipment. The cartridges may be single units for single gob systems, double units for double gob systems as illustrated in FIG. 1, or multiple units for larger systems such as triple gob systems.

The cartridges may be in two different sizes whereby all sized gobs from baby food bottles to gallon jugs can be accommodated. The smallest gob diameter is about one-half inch whereas the largest gob diameter is about 4 inches.

As will be apparent from the above, the cartridge 18 is stationary. The bushing 50 and its associated scoop 66 rotate or oscillate about the vertical longitudinal axis of bushing 50. It will be appreciated that the bushing 50 is merely an extension of the upper end of the scoop 66. If desired, bushing 50 may be separate from the scoop 66 and integral with the funnel 34 with the lower end of the bushing 50 aligned with the upper end of the scoop 66 which would then be driven directly by the gear 58.

The present invention may be embodied in other specific forms without departing from the spirit or essential attributes thereof and, accordingly, reference should be made to the appended claims, rather than to the foregoing specification as indicating the scope of the invention.

We claim:

1. A gob distributor cartridge for accelerating glass gobs in excess of gravity effect while the gobs are being delivered to molds in an I.S. machine comprising a rigid annular housing having an inlet end and an outlet end, the ID at the inlet end being greater than the ID at the outlet end, said housing being hollow and having an annular manifold, at least a portion of the inner peripheral surface of said housing converging in a direction from the inlet end toward the outlet end, said housing having a plurality of groups of circumferentially disposed flow passages extending from said manifold chamber to said portion of said surface of said housing, said passages being angled downwardly and converging toward said outlet end for discharge into said housing to progressively increase the pushing and centering effect of air from said passages on a gob as the gob moves through said housing, means defining an inlet to said manifold chamber, and the cross-section area of the passages having a sum which is less than the cross-section area of the inlet to the manifold chamber to maintain a positive pressure in the manifold chamber.

2. Apparatus in accordance with claim 1 wherein the inner peripheral surface of said housing has a throat located between the inlet and outlet ends of the housing.

3. Apparatus in accordance with claim 1 including an extension on said housing and having a tapered ID coaxial with the longitudinal axis of said housing.

4. Apparatus in accordance with claim 1 wherein said groups of passages include plurality of rows of holes on the inner peripheral surface of said housing, said holes constituting the outlet end of said passages and being uniformly distributed around the inner peripheral surface of said housing.

5. Apparatus in accordance with claim 1 wherein the longitudinal axis of each passage is at an angle of approximately 30°-60° with respect to the longitudinal axis of said housing.

6. Apparatus in accordance with claim 1 including a mounting member, at least one more housing connected to said mounting member alongside said first housing, whereby said mounting member and the housings thereon may be utilized in a multi-gob system.

7. Apparatus in accordance with claim 1 including a scoop having a bushing at one end thereof, said scoop and bushing being supported for rotation about the longitudinal axis of said bushing, and the upper end of said bushing being positioned with the outlet end of said housing to receive gobs from the outlet end of said housing.

8. Apparatus in accordance with claim 1 including a bushing coaxial with the outlet port at the outlet end of said housing, the inner peripheral surface of said bushing being tapered so as to converge in a downward direction, and said bushing being mounted for rotation about its longitudinal axis.

9. Apparatus for centering a downwardly falling gob to glass and accelerating the speed of the gob in excess of that attributed to gravity comprising a rigid metal housing, said housing being hollow and having an annular manifold chamber therein, said housing having an inlet to the manifold chamber, the ID of said housing converging in a direction from an inlet end toward an outlet end on said housing, said housing having a plurality of groups of circumferentially disposed flow passages extending from said manifold chamber to the ID of said housing, said passages being angled downwardly and converging toward said outlet end for discharge into said housing to progressively increase the pushing and centering effect of air from said passages on a gob as the gob moves through said housing, the flow passages being sufficient in number and located to induce a low pressure zone at the inlet end of the housing, means defining an extension adjacent the outlet end of said housing and coaxial with the outlet opening at the outlet end of the housing, a scoop below and having its upper end aligned with said extension, said scoop being supported for rotation about the axis of said extension.

* * * * *